United States Patent

Drossel et al.

(10) Patent No.: US 11,378,060 B2
(45) Date of Patent: Jul. 5, 2022

(54) METHOD FOR CONTROLLING A WIND TURBINE WHEN THE POWER SETPOINT VALUE IS CHANGED

(71) Applicant: Nordex Energy GmbH, Hamburg (DE)

(72) Inventors: Detlef Drossel, Norderstedt (DE);
Oliver Fleischmann, Hamburg (DE)

(73) Assignee: Nordex Energy GmbH, Hamburg (DE)

(*) Notice: Subject to any disclaimer, the term of this patent is extended or adjusted under 35 U.S.C. 154(b) by 163 days.

(21) Appl. No.: 16/830,796

(22) Filed: Mar. 26, 2020

(65) Prior Publication Data
US 2020/0309089 A1 Oct. 1, 2020

(30) Foreign Application Priority Data
Mar. 27, 2019 (EP) .................................... 19165511

(51) Int. Cl.
*F03D 7/02* (2006.01)
*F03D 7/04* (2006.01)
*F03D 13/35* (2016.01)

(52) U.S. Cl.
CPC .......... *F03D 7/028* (2013.01); *F03D 7/0224* (2013.01); *F03D 7/0292* (2013.01); *F03D 7/0296* (2013.01); *F03D 7/043* (2013.01); *F03D 13/35* (2016.05)

(58) Field of Classification Search
None
See application file for complete search history.

(56) References Cited

U.S. PATENT DOCUMENTS

| | | | |
|---|---|---|---|
| 10,844,838 B2 * | 11/2020 | Schlipf | ............... F03D 7/043 |
| 2017/0107973 A1 | 4/2017 | Drossel et al. | |
| 2019/0257289 A1 * | 8/2019 | Schlipf | ............... F03D 7/043 |

FOREIGN PATENT DOCUMENTS

| | | |
|---|---|---|
| DE | 102016212362 A1 | 11/2018 |
| EP | 2224129 B1 | 9/2016 |
| EP | 3165756 A1 | 5/2017 |
| EP | 3156646 B1 | 5/2018 |
| WO | 2010/084131 A2 | 7/2010 |
| WO | 2015/078478 A1 | 6/2015 |
| WO | 2016/138906 A1 | 9/2016 |
| WO | 2016/198076 A1 | 12/2016 |
| WO | 2016/198077 A1 | 12/2016 |
| WO | 2017/190744 A1 | 11/2017 |
| WO | WO-2018007011 A1 * | 1/2018 ............. F03D 7/043 |

* cited by examiner

*Primary Examiner* — Juan G Flores
(74) *Attorney, Agent, or Firm* — Barclay Damon LLP

(57) ABSTRACT

A method is disclosed for controlling a wind turbine, where the wind turbine includes with a tower and a rotor and comprises having at least one rotor blade with an adjustable blade pitch angle, and where a change in a power value takes place in a time interval (TE) and by the control of one or more operating parameters which determine power to be fed in by the wind turbine. The method comprises determining a parameterized time function of a tower deflection for the time interval (TE). A series of boundary conditions are defined for the parameterized time function of the tower deflection and a thrust of the rotor of the wind turbine is determined for the parameterized time function of the tower deflection. A function is then calculated for controlling the one or more operating parameters from the thrust of the rotor.

9 Claims, 2 Drawing Sheets

METHOD FOR CONTROLLING A WIND TURBINE WHEN THE POWER SETPOINT VALUE IS CHANGED

CROSS REFERENCE TO RELATED INVENTION

This application is based upon and claims priority to, under relevant sections of 35 U.S.C. § 119, European Patent Application No. 19 165 511.7, filed Mar. 27, 2019, the entire contents of which are hereby incorporated by reference.

BACKGROUND

The present invention concerns a method for controlling a wind turbine in the event of a change in the power setpoint value. A change of the power setpoint value can occur for various reasons, e.g. the change of the power setpoint value can be externally predetermined or may result from the operation of the wind turbine itself. Changes in the power setpoint value are considered in which a changed power setpoint value is to be reached within a predetermined time interval.

A simple approach to implement a change in the power of the wind turbine is to approach a new power setpoint value with a ramp having a constant gradient or slope within the predetermined time interval by changing one or more operating parameters. Two different cases can be distinguished: In the first case, the actual power value is controlled by the operating parameter(s) in such a way that the actual power value is controlled in linear form along a ramp to the new power setpoint. This corresponds to a ramped control of the actual power value. Alternatively, it is also possible to determine the operating parameter(s) corresponding to the new power setpoint value. In order to reach the new power setpoint value, the current operating parameters can then, for example, be ramped linearly, within the predetermined time interval, to the new values of the operating parameters for the modified power setpoint value. This change in operating parameters does not necessarily lead to a linear change in the power setpoint value, as the relationship between the operating parameters and the power setpoint value can also be non-linear.

From WO 2016/198077 A1 a control system is known for a wind turbine which has a ramp change delimiter which limits the rate of change depending on the power difference between the power setpoint value and an estimated available wind power.

From WO 2017/190744 A1 a control system for a wind turbine has become known, which uses a predictive control in the event of a low voltage grid fault.

From EP 3 165 765 A1, a method and a control system for controlling an pitch angle of a rotor blade has become known, in which, during a deceleration process, a time-dependent setpoint rotational speed is specified as a command variable of a rotational speed controller of the wind turbine, the rotational speed of the rotor of a wind turbine being controlled by a rotational speed controller which changes the pitch angle of the rotor blade in order to control the rotational speed.

From WO 2015/078478 A1, a control method has become known in which a setpoint for a blade pitch angle is determined via a forward control.

From WO 2016/138906 A1 a procedure for a wind turbine has become known in which the controllability of the wind turbine is maintained in a low energy mode.

WO 2016/198076 A1 describes a control system for a wind turbine in which the blade pitch angle is changed according to a requested power.

From EP 2 224 129 B1, a control method for a wind turbine has become known with which oscillations can be damped. For this purpose, a maximum change in torque is determined, starting from an initial torque.

From EP 3 156 646 B1 a wind turbine has become known which has a pilot control with an inverse control system. The inverse control system determines a power torque from the rotational speed setpoint value and the power setpoint value and an acceleration torque from the time dependent change of the rotational speed setpoint value.

BRIEF SUMMARY OF THE INVENTION

The invention is based on the task of providing a method for a wind turbine which, in the event of a change in a power setpoint value for the wind turbine, reliably implements the change by simple means.

A method is provided and intended for controlling a wind turbine in the event of a change in a power value for the power to be fed in by the wind turbine, the change in the power value having to take place within a time interval. Preferably the change in the power value is a change in a power setpoint value. The duration of the time interval can, for example, be specified externally by an energy supply company or be freely selected e.g. as a predetermined time interval. The wind turbine has a tower with a rotor on which at least one rotor blade is provided to drive the rotor. In response to the change in the power value provided for the time interval, one or more operating parameters determining the power to be fed in by the wind turbine are addressed. A function for controlling the operating parameter or parameters is calculated from the thrust of the rotor. The function for controlling the operating parameter(s) shall indicate in a suitable form the time course of the operating parameter(s) for reaching the adjusted power value in the time interval. The adjusted power value can represent an increase or a decrease of the power value, e.g. of the power setpoint value. The control function describes how the adjusted power value can be achieved by the wind turbine with the aid of the operating parameter(s). In an embodiment of the method according to the invention, a thrust of the rotor onto the mass of the wind turbine comprising tower and nacelle is initially determined. The applied thrust acts through the force absorbed from the wind on the mass of the wind turbine which is able to oscillate, also called tower head for short. From the determined thrust of the rotor on the tower head of the wind turbine, the function for controlling the operating parameter(s) to be controlled is determined. When determining the thrust, the effective thrust of the rotor can be represented accordingly, based on the current operating conditions of the wind turbine. From the possible functions, a technically possible function is selected which leads to a thrust of the rotor that can be represented at the wind turbine with the operating parameters. In a further step of the method according to the invention, the function for the control of the operating parameter or operating parameters is then determined for the course of the thrust. The course of movement of the tower of the wind turbine is considered to be an oscillation course, whereby this does not have to take the form of a periodic or harmonic oscillation. Rather, the oscillation course can also correspond to a movement of the tower to a new position, which results from the thrust of the rotor for the changed power setpoint value.

By means of a parameterized time function of the tower deflection, the course over time of the movement of the tower or the tower head is specified in such a way that a low load occurs for the tower of the wind turbine. The core idea of the method according to the invention is to determine the change of the operating parameters on the basis of the parameterized time function of the tower deflection for which a low load for the wind turbine occurs. The core of the consideration here is that due to a non-linear behavior of a system capable of oscillating, such as the tower of a wind turbine, the change of the operating parameter or the operating parameters have different effects and can be adapted to the non-linear system via the specified parameterized time function of the tower deflection. The parameterized time function of the tower deflection is determined by a series of boundary conditions. The boundary conditions include, for example, the values of the parameterized time function of the tower deflection at a start and an end point in time or the speed of the tower deflection at this point in time.

In a preferred embodiment of the method according to the invention, a blade pitch angle of at least one rotor blade of the wind turbine forms the operating parameter to be controlled. Controlling the power setpoint value for a wind turbine by changing the blade pitch angle is sufficiently known. With a change of the blade pitch angle the power absorbed from the wind changes as well as the thrust of the rotor acting on the rotor blade and thus also on the tower of the wind turbine. In this respect, there is a clear correlation between the blade pitch angle and the thrust of the rotor, which can be used to convert the thrust of the rotor determined for the parameterized time function of the tower deflection into controlling the operating parameters.

In a further preferred embodiment of the method according to the invention, the parameterized time function of the tower deflection describes one or more tower-specific constants, such as the first natural frequency, the damping constant of the tower oscillation and/or also geometric tower dimensions. Usually the time interval in which the change of the power setpoint value is to be implemented determines how fast or how slow the power setpoint value is to be changed. Accordingly, the parameterized function is also a time function, whereby this can also extend over a longer or shorter period of time than the time interval.

In a preferred embodiment, the parameterized time function of the tower deflection fulfils boundary conditions that characterize the tower movement. When determining the desired time function, the parameters are determined by the boundary conditions, so that the parameterized time function describes an unambiguous course of movement for the tower by applying the boundary conditions. The number of possible boundary conditions depends on the number of parameters in the parameterized time function for the tower deflection and on the relationship between thrust and tower deflection. If a second order differential equation is assumed as the relation, two boundary conditions are already necessary for an unambiguous solution of the differential equation.

A possible class of parameterized time functions consists, for example, of composite functions that have a linearly increasing part and an oscillatory part. Both parts are themselves parameterized and can also be combined in a suitably weighted manner in order to ensure a minimum load on the tower.

In an embodiment of the method, the parameterized time function describes one or more tower-specific constants, such as the first natural frequency, the damping constant of the tower oscillation and/or also geometric tower dimensions. As a boundary condition, it has proven to be particularly advantageous to limit the maximum deflection of the tower and to let it oscillate preferably only up to its end position. As already mentioned, the term "tower oscillation" here does not necessarily imply a periodic or even harmonic oscillation. The term "tower oscillation" is already used when the tower of the wind turbine changes its position over time. The maximum deflection is a possible measure for the load on the tower caused by the power change.

A tower-specific constant, which plays a special role in the class of parameterized time functions, is the first natural frequency of the tower. With the first natural frequency of the tower, a parameter which describes the oscillation behavior of the tower is directly included in the consideration and also affects the time course when controlling the operating parameters. In addition, the tower damping can also be included in the parameterized time functions.

BRIEF DESCRIPTION OF THE DRAWINGS

The method according to the invention is described in more detail below. The figures show.

DETAILED DESCRIPTION OF THE INVENTION

Figure 1:
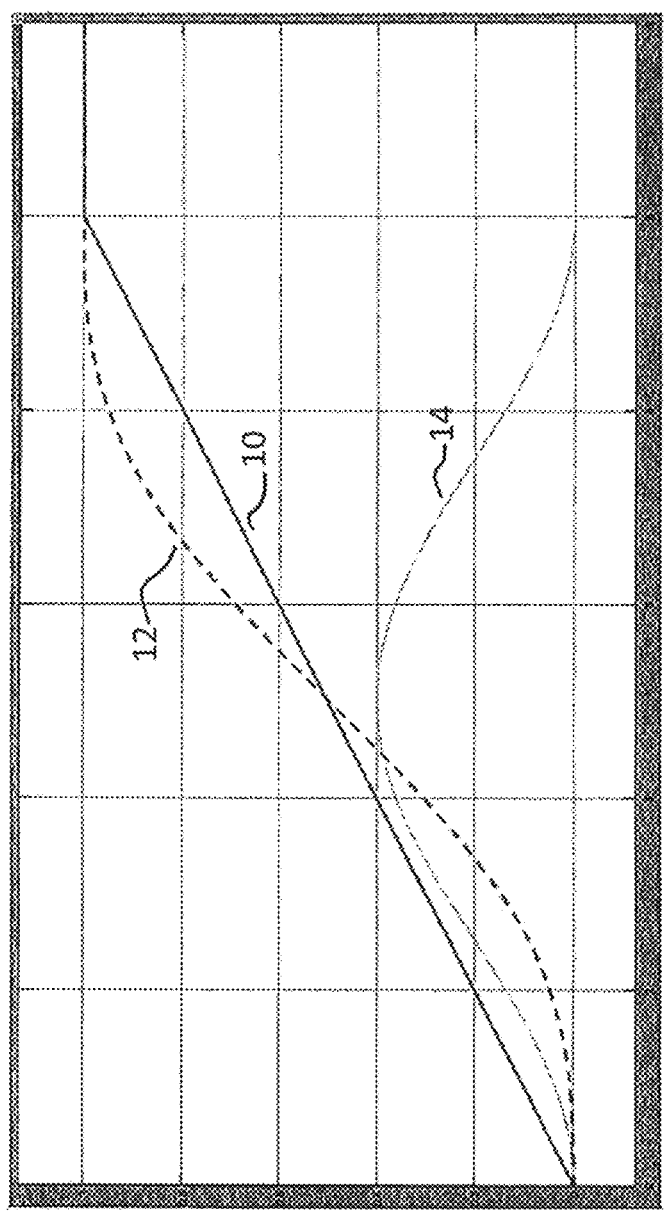
FIG. 1 illustrates a graphical representation of an example of the time-dependent course of the tower deflection with different applied force curves.

The central idea of the method according to the invention is to define the parameterized time function L(t), which determines a change in the operating parameters. For the change of the operating parameters, the thrust acting on the tower of the wind turbine over time is calculated. From the force progression over time and knowing the oscillation equation for the tower of the wind turbine, the tower oscillation can then be determined using initial conditions. The oscillation curve of the tower determines how strongly the tower is mechanically loaded.

In principle, such problems can be formulated mathematically in different ways. In order to gain a good understanding, the differential equation for tower deflection is used here. This is the differential equation of second order for a damped harmonic oscillation with an impressed excitation. Let L(t) be a time function describing the deflection of the tower, and let F(t) be a time function describing the force on the tower head. Starting from defined initial conditions for t=0, such as L(0)=L̇(0)=0, the behavior of the tower oscillation over time can be described by the following differential equations:

$$\ddot{L} + \frac{2D}{\omega_T}\dot{L} + \frac{L}{\omega_T^2} = F.$$

For the sake of simplicity, the tower spring constant has been set to one, so that the oscillation is determined by the tower natural frequency $\omega_T$ and the damping D of the tower oscillation.

The boundary conditions indicate that the tower is at rest at the beginning of the observation (t=0) and has no initial speed. Of course, a starting position corresponding to the current tower position and speed could also be selected. The time function L(t), which describes the tower deflection, is substituted into the differential equation and thus gives the force function F(t).

To emphasize the relation between the tower deflection in the time and force function, this is demonstrated with solving the differential equation. The following parameterized time function is assumed to be advantageous for the tower deflection:

$$L = \frac{L_E}{T_E}t - b*\sin\left(\frac{2\pi}{T_E}t\right),$$

where $L_E$ is the end position of the tower deflection at time $t=T_E$. $T_E$ describes here the duration of the predetermined time interval in which the power setpoint value is to be changed; b is a parameter which weights the oscillatory part of the time function. The first derivative of the time function L(t) is $$\dot{L} = \frac{L_E}{T_E} - b*\frac{2\pi}{T_E}\cos\left(\frac{2\pi}{T_E}t\right).$$

The second derivative of the time function L(t) is $$\ddot{L} = b*\left(\frac{2\pi}{T_E}\right)^2\sin\left(\frac{2\pi}{T_E}t\right).$$

Taking into account the boundary condition $L(T_E)=L_E$, according to which the tower deflection has reached its end position $L_E$ at the end point in time $T_E$, the following condition results for parameter b:

$$b = \frac{L_E}{2\pi}.$$

With this value of b, moreover, the first derivative at the start and end point in time is 0, so the tower head is at rest at the beginning (t=0) and at the end (t=$T_E$) with a speed of zero.

For the force curve, two cases can be distinguished. The first case is given when the time period $T_E$ is chosen as $$\left(\frac{2\pi}{\omega_T}\right) = \frac{1}{f_T}.$$

With the parameter value $$T_E = \left(\frac{2\pi}{\omega_T}\right) = \frac{1}{f_T},$$

substituted in the equation above, the following force curve F(t) results:

$$F(t) = \frac{L_E}{T_E}t + \frac{2D}{\omega_T}\frac{L_E}{T_E}\left(1 - \cos\left(\frac{2\pi}{T_E}t\right)\right).$$

However, this equation is only true if $$T_E = \left(\frac{2\pi}{\omega_T}\right) = \frac{1}{f_T}.$$

The second case is given if $T_E$ is specified independently of the tower natural frequency $\omega_T$, for example by grid requirements or other specifications. In this case the general rule applies:

$$F(t) = \frac{L_E}{T_E}t + \frac{L_E}{2\pi}\left(\frac{1}{\omega_T^2}\frac{(2\pi)^2}{T_E^2} - 1\right)*\sin\left(\frac{2\pi}{T_E}\tau\right) + \frac{2D}{\omega_T}\frac{L_E}{T_E}\left(1 - \cos\left(\frac{2\pi}{T_E}t\right)\right).$$

This force curve on the wind turbine leads to the tower deflection, which can be described with the time function L(t).

Assuming a tower damping $D=3\times10^{-3}$ and $T_E=2\pi/\omega_T$, the oscillating term can be neglected and there is an approximately linear increase of the ramp force. FIG. 1 shows with line 10 the force curve over time, while the dotted line 12 shows the tower deflection over time. Line 14 shows the speed of the tower movement.

Figure 2:
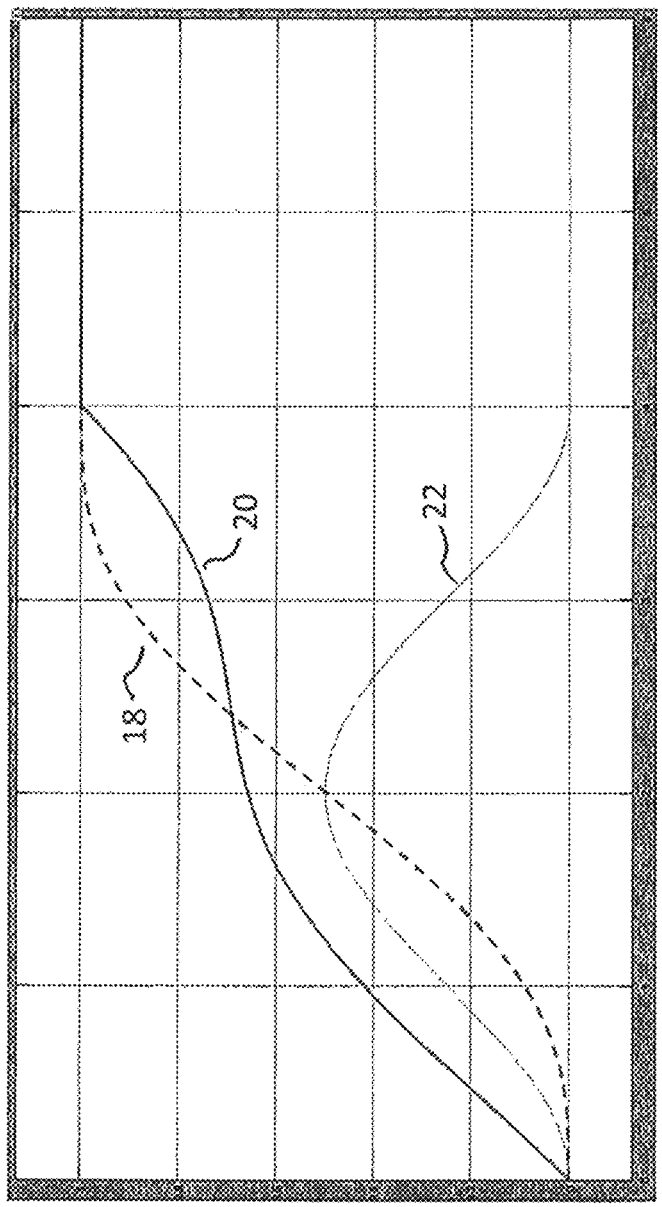
FIG. 2 illustrates a further graphical representation of an example for the course of the tower deflection over time with a non-linear force progression.

FIG. 2 shows the behavior of the tower at a tower damping $D=2\times10-1$ and $T_E<2\pi/\omega_T$. This significantly stronger damping of the tower and the shorter time $T_E$ causes the cosine term and the sine term to come into play in term F(t), i.e. the tower oscillates. FIG. 2 shows the tower deflection indicated by the dashed line 18 that the force 20 acting on the tower does not grow linearly but fluctuates in an oscillatory manner. It can also be clearly seen that there is a different speed profile 22. It should be noted that in FIG. 2 the specified end point in time is to be reached earlier than in FIG. 1, i.e. the period TE is selected to be shorter.

The relationship between the blade pitch angle as the operating parameter and the thrust of the rotor on the tower $F_s$ of the wind turbine is given by the following equation $$F_s = ct(\text{pitch}, \text{TSR})*0.5*A*rho*v^2,$$

where A is the rotor area, v is the wind speed, pitch is the blade pitch angle, TSR is the tip speed ratio and rho is the air density. It is the thrust coefficient which is a function of the blade pitch angle and the tip speed ratio TSR.

From the equation above, the relationship between changes in operating parameters, such as blade pitch angle, and the thrust of the rotor on the tower Fs can now be determined. Of course, this relationship can also be used in the opposite direction, for example if there is a preferred time-related force curve for the tower. So, it is possible to reverse-engineer which blade pitch angle at which speed TSR is to be set at the wind turbine in order to achieve the desired time-related force curve.

The above embodiment with the method according to the invention starts from a curve L(t) describing the deflection of the tower over time. Such a deflection-curve may occur in a situation in which a power setpoint value, in particular a setpoint of the actual power is changed. There are other situations where changes in the electrical setpoint value can cause oscillations of the tower which can be reduced or even avoided using the method according to the invention. Such situations encompass but are not limited to turbine-controlled stops during which the wind turbine is shut down. Another situation in which changes of the electrical setpoint value also occur is for example curtailment operation of the wind turbine. Curtailment operation can be used in different situations e.g. due to noise reduction, cast shadows in the proximity of the wind turbine, or due to turbulence either in a wind park or for a stand-alone wind turbine. The electrical power value is changed when the curtailment operation is initiated and when the curtailment operation ends. In both situations there is a change in the electrical setpoint value for the active power. Further rapid changes in the electrical power value can occur during a fault ride through (FRT) in which the wind turbine operation is controlled while grid voltage is low. During brake procedures for the wind turbine there can also occur situations which require a fast power ramp for the wind turbine.

According to different grid-codes in different countries, there are different limitations known for the fastest power decrease which can be demanded, e.g. in Poland and Estonia a power decrease from 100% to 20% of the nominal power within 2 seconds can be demanded. Other grid-codes use different limitations such as the high voltage grid-code in Germany which can demand a power reduction from 100% to 46% nominal power within 2 seconds.

The usual displacement of the nacelle of the wind turbine related to a vertical axis of the tower is about 2 m in nominal operation of the wind turbine. At fast power ramps with a quick change in the active power setpoint value of the wind turbine the nacelle can swing back and forth by up to 2.5 m. A typical period of a tower oscillation is 6 seconds for a 125 m tower.

LIST OF REFERENCE SIGNS

10 Linear force curve
12 Tower deflection
14 Speed
18 Tower deflection
20 Force curve
22 Speed

The invention claimed is:

1. A method for controlling a wind turbine, the wind turbine including a tower and a rotor, and comprising at least one rotor blade including an adjustable blade pitch angle, wherein a change in a power value takes place in a time interval (TE) and by control of one or more operating parameters which determine power to be fed in by the wind turbine, the method comprising:
   determining a parameterized time function of a tower deflection for the time interval (TE), wherein a series of boundary conditions are defined for the parameterized time function of the tower deflection;
   determining a thrust of the rotor of the wind turbine for the parameterized time function of the tower deflection;
   calculating a function for controlling the one or more operating parameters from the thrust of the rotor; and
   controlling the rotor based on the calculated function,
   wherein the parameterized time function of the tower deflection comprises a linearly increasing portion and an oscillatory increasing portion.

2. The method according to claim 1, wherein the change in the power value comprises a change in a power setpoint value.

3. The method according to claim 2, wherein the parameterized time function of the tower deflection exhibits a maximum tower deflection which does not exceed beyond an end position of the tower deflection.

4. The method according to claim 3, wherein the parameterized time function of the tower deflection does not exceed a maximum change in the power setpoint value in a predetermined time interval.

5. The method according to claim 1, wherein the function for controlling the one or more operating parameters comprises adjustment of the blade pitch angle of the at least one rotor blade.

6. The method according to claim 1, wherein the parameterized time function of the tower deflection comprises one or more tower-specific constants ($\omega_T$).

7. The method according to claim 1, wherein the parameterized time function of the tower deflection complies with boundary conditions, and wherein first and second derivatives of the parameterized time function of the tower deflection are cleared when a new power setpoint value is reached.

8. A method for controlling a wind turbine, the wind turbine including a tower and a rotor, and comprising at least one rotor blade including an adjustable blade pitch angle, wherein a change in a power value takes place in a time interval (TE) and by control of one or more operating parameters which determine power to be fed in by the wind turbine, the method comprising:
   determining a parameterized time function of a tower deflection for the time interval (TE), wherein a series of boundary conditions are defined for the parameterized time function of the tower deflection;
   determining a thrust of the rotor of the wind turbine for the parameterized time function of the tower deflection;
   calculating a function for controlling the one or more operating parameters from the thrust of the rotor; and
   controlling the rotor based on the calculated function,
   wherein the parameters of the parameterized time function are determined by boundary conditions so that the parameterized time function describes an unambiguous course of movement for the tower.

9. The method according to claim 8, wherein the parameterized time function of the tower deflection comprises a linearly increasing portion and an oscillatory increasing portion.

* * * * *